Patented Sept. 16, 1930

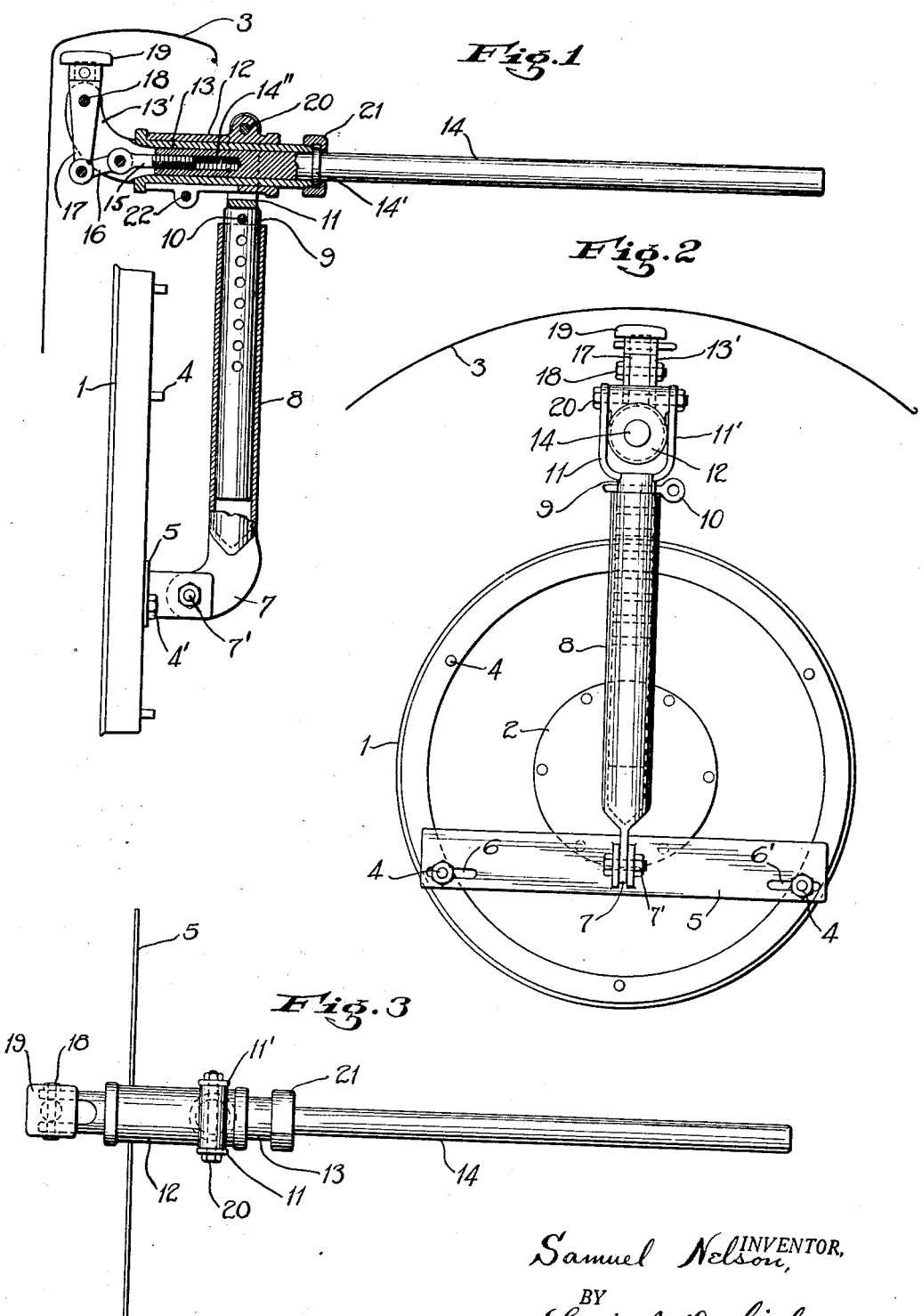

1,775,968

UNITED STATES PATENT OFFICE

SAMUEL NELSON, OF MAPLEWOOD, NEW JERSEY

FENDER-STRAIGHTENING TOOL

Application filed April 25, 1929. Serial No. 357,985.

The object of this invention is to provide an efficient tool or device for straightening fenders or "mud guards" of automobiles when the same have been dented or bent.

These fenders are substantially concentric with the wheels for a great part of their extent and one feature of the present invention is in the mounting of the device on a wheel in such a manner that it may be readily brought into position beneath any portion of the fender by rotating the wheel. Further adjustment of the device and certain operative parts thereof into the most effective position is provided by the novel construction and arrangement of the several parts, which will be described more fully hereinafter in connection with the description of the device illustrated in the accompanying drawings, as illustrative of one form of the device.

In the drawings, like parts in the several views have been given the same reference numeral.

Fig. 1 is a side elevation, partly in section, of a device of the character described, showing the same attached to an automobile wheel, from which the tire has been removed; Fig. 2 is a front view of Fig. 1 and Fig. 3 is a plan view of the same removed from the wheel.

An automobile wheel, with the tire removed, is indicated at 1 and the hub portion at 2. The tire is usually mounted on a separate rim which is positioned on the wheel rim 1 and held by fastening members held, in turn, by nuts on the studs 4 mounted at suitable intervals around the rim 1.

These studs 4 are utilized to secure my device to the wheel rim by providing a transverse support 5, having slots 6—6', which is positioned on two of these studs 4 and secured thereon by suitable nuts 4', as shown in Figs. 1 and 2. The slots 6—6' provide for placing the support on wheels of different sizes and in some cases the nuts 4' need not be used, the device resting on the studs 4.

Telescoping members 8 and 9 are pivotally mounted on the transverse support 5, the outer member 8 being provided with an inwardly extending portion 7 pivoted between projecting portions of the support 5 by means of the bolt 7'. The inner telescoping member 9 is provided with a number of transverse openings through one of which a pin 10 is inserted, above the upper end of the outer member 8, to provide for vertical adjustment of the same. At the upper end of the member 9 a U-shaped yoke, 11—11', is attached.

An outer horizontal tubular supporting member 12 is pivotally suspended at 20 in the yoke 11—11'. In this member 12 an inner horizontal tubular supporting member 13 is slidably and rotatably mounted or carried. At the inner end of this member 13 an upwardly extending yoke 13' is formed and extends beyond the inner end of the supporting member 12, as shown in Fig. 1.

A handle member 14 extends into and is rotatably carried in the inner supporting member 13 and is provided with a flange 14' engaging the outer end of the support 13 and held by the cap 21 on the outer end thereof against longitudinal withdrawal but permitting rotation of the handle. The inner end of the handle 14 is provided with a tapped opening 14" in which is engaged one end of an eye-bolt 15, the opposite end of the eye-bolt being connected by a link 16 to the lower end of a lever 17, pivoted at 18 in the yoke 13'.

At the upper end of the lever 17 a member 19, which may be designated as an "anvil", is removably mounted. This anvil may be of any desired shape and size to perform its function, which will be hereinafter set out, and several anvils of different sizes and shapes may be provided and which may be interchanged, according to the character of the distortion in the fender. The fender of the automobile is indicated at 3 by a single line, as the shape is not important.

Dents or bends in an automobile fender may be readily straightened out by hammering the outside of the fender smooth and straight against a substantially rigid support, in the nature of an "anvil", positioned underneath the same.

To use the tool forming the subject of my invention, the wheel is raised and the tire removed. The proper shaped anvil 19 is positioned on the upper end of the lever 17 and the device positioned on the studs 4, as hereinbefore described. The wheel is then rotated sufficiently to bring the anvil 19 transversely in alinement with the bent portion of the fender. The device is swung, as a whole, transversely to the plane of the wheel, about the pivot 7′ and the telescoping members 8 and 9 adjusted to the required height. The support 13 may be turned in the member 12 and also slid longitudinally therein, being finally clamped in position by means of the bolt 22. The anvil 19 may be further adjusted into the desired position by swinging the lever 17 about its pivot 18 by turning the handle 14, as will be seen by reference to Fig. 1. By pressing down the outer end of the handle 14, the anvil 19 will be raised against the under side of the fender by the leverage about the pivot 20. This action may be used to force out inwardly bent portions, which are then hammered smooth from the outside against the anvil 19, which is held thereagainst by the downward pressure on the handle 14. It will be seen that the several adjustments provided by this construction permit the anvil to be placed in the most effective position beneath the fender and to be readily shifted from place to place without removing the same from the wheel, resulting in a saving of time and a satisfactory repair being made upon fenders of various shapes.

The device may be mounted upon or attached to the hub portion of the wheel instead of the rim, as shown, if desired, the position of the openings 6—6′ in the transverse support 5 being arranged accordingly, as will be understood.

What I claim as new and desire to secure by Letters Patent is:—

1. A device of the class described, comprising a support adapted to be carried by a wheel, a pair of telescoping members pivotally mounted on said support and provided with means for adjustable positioning of one in the other, an outer tubular member pivotally suspended on the upper end of said adjustable telescoping member with its axis extending transversely thereof, an inner tubular supporting member slidably and rotatably mounted in said outer tubular member and extending beyond either end thereof, a handle member extending into and rotatably carried by said inner supporting member and provided with a flange held by a cap on one end of said inner supporting member to retain said handle against longitudinal movement but permitting rotation thereof, said handle being provided with a tapped opening at its inner end, an eye-bolt engaged in said tapped opening, a lever pivotally mounted on the inner extending end of said inner supporting member and transversely thereto, a link connecting said eye-bolt and the lower end of said lever, and an anvil member removably positioned on the upper end of said lever.

2. A device of the class described, comprising a transverse support adapted to be carried by a wheel, a pair of telescoping members pivotally mounted on said support and provided with means for adjustable positioning of one in the other, supporting means pivotally suspended and extending transversely on the upper end of said adjustable telescoping member, a handle carried by said supporting means, a lever pivotally mounted on said supporting means and operatively connected with said handle, and an anvil member positioned upon said lever.

3. A device of the class described, comprising a support adapted to be carried by a wheel, vertically adjustable members pivotally mounted upon said support, transverse supporting members pivotally suspended on said vertically adjustable members, one of said supporting members being rotatably and slidably mounted in the other, a handle carried by said transverse supporting members, a lever pivotally mounted on one of said supporting members and operatively connected with said handle, and an anvil member positioned upon said lever and adapted to be brought into operative position by the manipulation of said members by said handle.

4. A device of the class described which is adapted to be mounted upon a wheel of an automobile and rotated therewith underneath the fender and provided with vertically adjustable supporting members pivotally mounted for movement transverse to the plane of the wheel, supporting means pivotally suspended on one of said supporting members and extending transversely thereof, a handle carried by said supporting means, a lever pivotally mounted on one end of said supporting means operatively connected to and adapted to be operated by said handle, and an anvil member positioned upon said lever and adapted to be brought into operative position by the manipulation of said members by said handle.

Signed at Maplewood, in the county of Essex and State of New Jersey, this 23d day of April, A. D. 1929.

SAMUEL NELSON.